(12) United States Patent
Palfenier et al.

(10) Patent No.: US 6,546,780 B1
(45) Date of Patent: Apr. 15, 2003

(54) POSITION SENSOR METHOD AND APPARATUS

(75) Inventors: Samuel Roland Palfenier, El Paso, TX (US); Cecilia Hernandez, CD. Juarez Chih. (MX)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/012,818

(22) Filed: Dec. 10, 2001

(51) Int. Cl.$^7$ ............................................... G01B 21/22
(52) U.S. Cl. ........................... 73/1.75; 73/1.79; 73/162
(58) Field of Search .................. 73/1.75, 1.79, 73/162

(56) References Cited

U.S. PATENT DOCUMENTS

| | | | | |
|---|---|---|---|---|
| 5,218,769 A | * | 6/1993 | Tranchon | 33/1 PT |
| 6,155,106 A | * | 12/2000 | Sano | 73/118.1 |
| 6,481,272 B1 | * | 11/2002 | Kieslbach | 73/118.1 |
| 6,488,115 B1 | * | 12/2002 | Ozsoylu et al. | 180/444 |

* cited by examiner

Primary Examiner—Daniel S. Larkin
Assistant Examiner—Rodney Frank
(74) Attorney, Agent, or Firm—Margaret A. Dobrowitsky

(57) ABSTRACT

A sensor assembly for sensing the angular position of a rotatable body such as a motor vehicle steering column. The sensor assembly includes a ring gear which is zero calibrated upon assembly of the sensor assembly. The sensor assembly further includes a ring member which functions to lock the ring gear to the sensor housing to maintain the zero calibration between the time of calibration and the subsequent mounting of the sensor assembly on the steering column and further functions to release the ring member for free rotation with the steering column in response to mounting of the sensor assembly on the steering column. The locking and releasing functions of the sensor assembly are performed by a finger structure of the ring member which includes a free end which is engaged in a notch in the sensor housing upon calibration of the sensor assembly to maintain the calibration setting and which further includes a release portion which is engaged by the steering column as the sensor assembly is mounted on the steering column to pivot the finger structure in a sense to move the free end of the finger structure out of the housing notch.

13 Claims, 6 Drawing Sheets

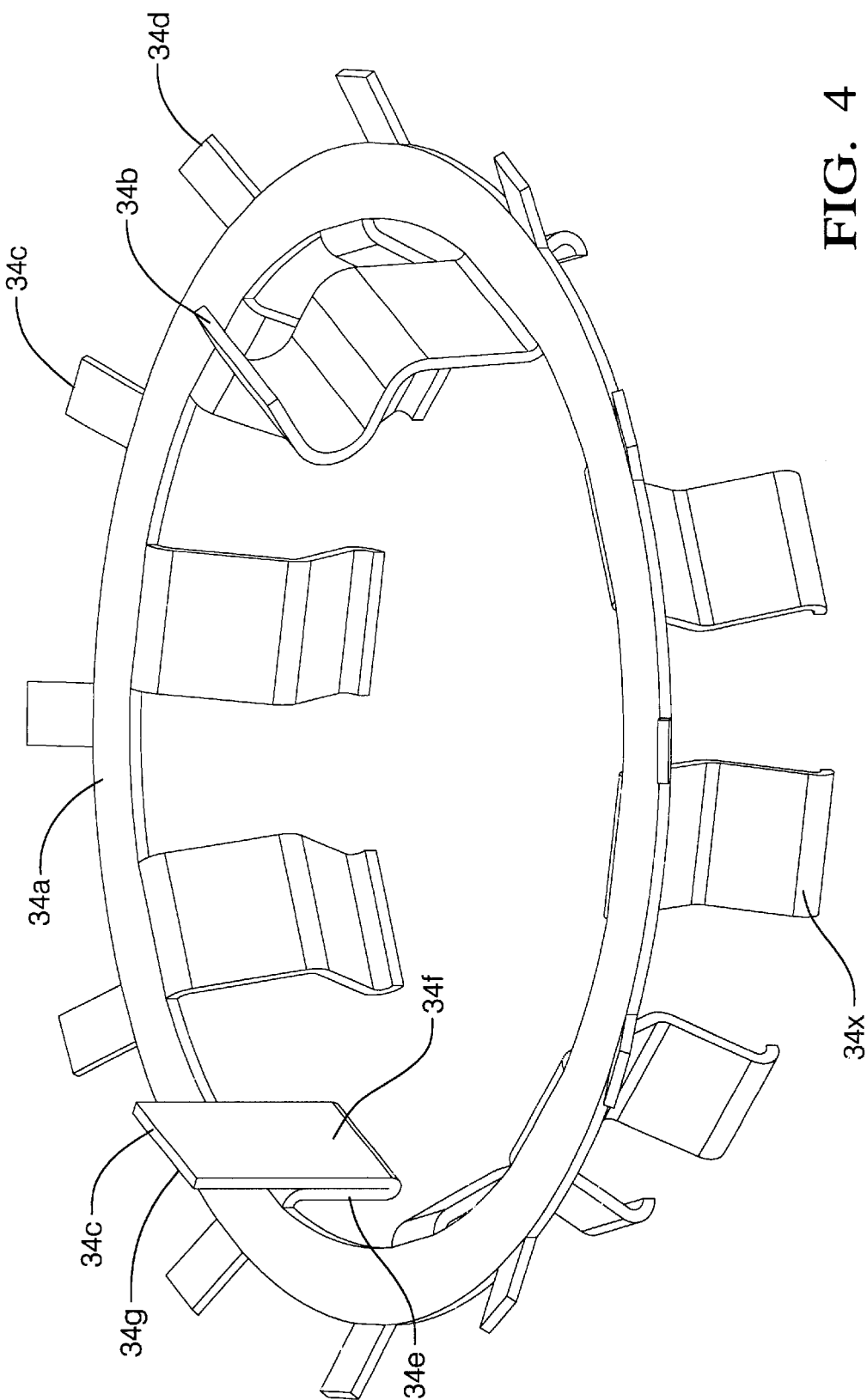

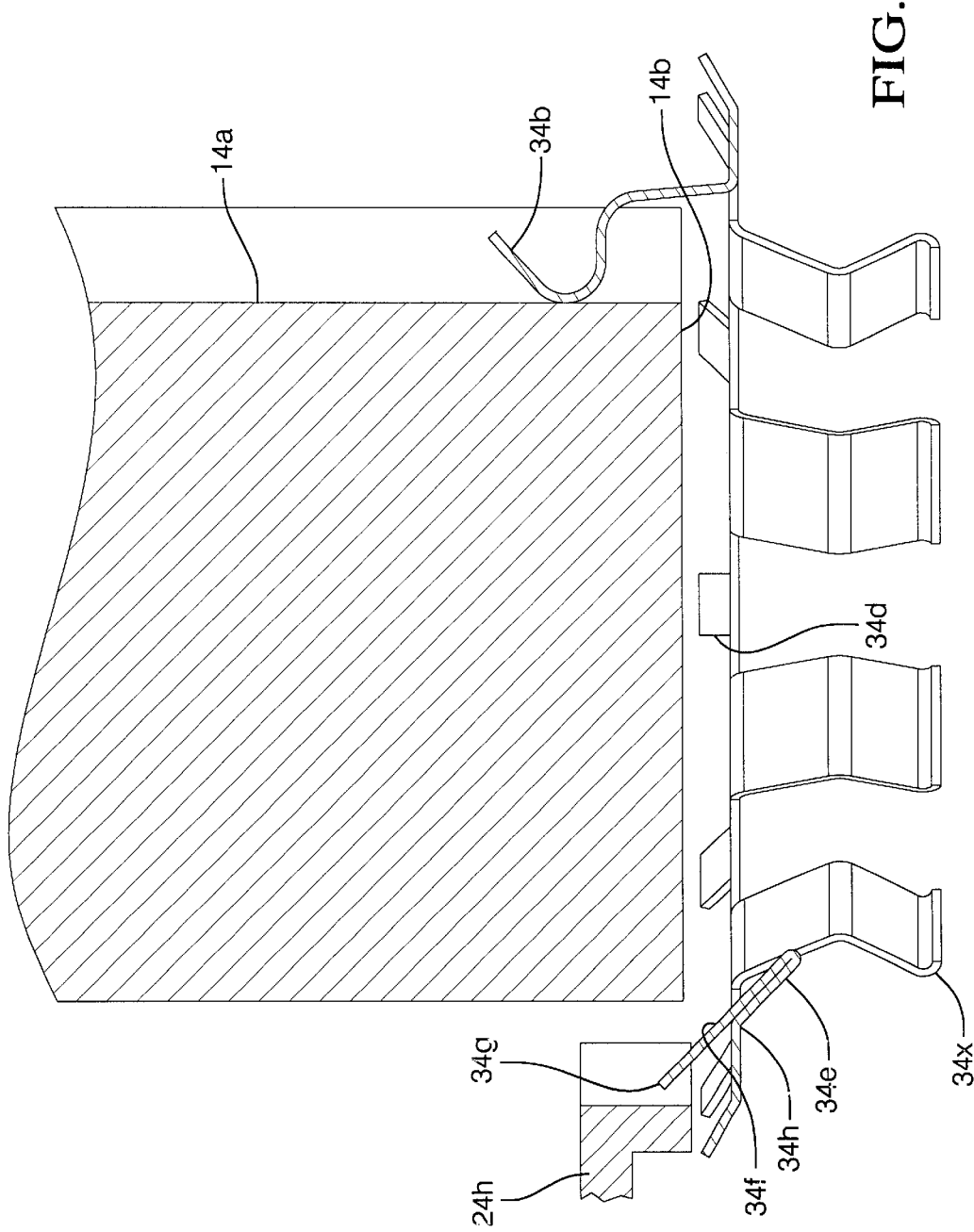

POSITION SENSOR METHOD AND APPARATUS

FIELD OF THE INVENTION

This invention relates to a position sensing method and apparatus and particularly to a sensor assembly for sensing the angular position of a rotatable body.

It is desirable in many applications to sense the angular position of a rotatable body. For example, it is desirable in a motor vehicle to sense the angular position of the steering column and generate a control signal representative of the angular position of the steering column. This control signal may be used, for example, to control a steer-by-wire steering system, to vary the setting of an active suspension system in response to turning movement of the vehicle, or to control a four-wheel steering system.

The sensors employed to sense the angular position of a steering column are typically calibrated prior to installation on the steering column and it is imperative that the calibration zero position be maintained between the time that the sensor is calibrated and the time that the sensor is assembled onto the steering column. It is also imperative that, upon installation of the sensor on the steering column, the operative sensor member be free to rotate with the steering column whereby to generate a position signal indicative of the angular position of the steering column.

In one prior art design, these dual requirements have been satisfied by the use of an anti-rotation pin which lockingly interconnects the sensor operative member to the sensor housing to maintain the zero calibration position and which is removed following installation of the sensor on the steering column to allow the sensor operative member to freely rotate with the steering column. Whereas this pin design satisfies both requirements, the provision of the pin complicates the sensor design and increases the assembly time. The pin design also introduces the possibility that the installer may forget to remove the pin following installation of the sensor on the steering column.

SUMMARY OF THE INVENTION

This invention relates to an improved position sensor for use with a rotatable body.

More specifically this invention relates to a position sensor having provision to maintain the zero calibration of the sensor prior to installation on the rotatable body and to automatically release the operative element of the sensor for rotation with the rotatable body in response to installation of the sensor on the rotatable body.

One aspect of the invention relates to a method of mounting a sensor assembly on the rotatable body following calibration of the rotatable element of the sensor assembly. According to the invention methodology, the rotatable element is calibrated; the rotatable element is lockingly engaged relative to the sensor housing to maintain the rotatable element in the calibrated position; and, with the rotatable element in the calibrated position, the sensor assembly is mounted on the rotatable body while simultaneously keying the rotatable element to the rotatable body and releasing the rotatable element from locking engagement with the sensor housing. This methodology maintains the zero calibration of the sensor prior to installation on the rotatable body and automatically releases the rotatable element of the sensor for turning movement with the rotatable body in response to mounting of the sensor on a rotatable body.

According to a further aspect of the invention methodology, the sensor assembly includes a connector member connected to the rotatable element and including a key structure for keying the connector member and rotatable element to the rotatable body and an anti-rotation structure for lockingly engaging the connector member to the sensor housing; the anti-rotation structure functions prior to the mounting step to maintain the calibrated position of the rotatable element; and, during the mounting step, the key structure functions to key the connector member and rotatable element to the rotatable body and the rotatable body is operative to move the anti-rotation structure out of locking engagement with a sensor housing. This methodology provides a ready and effective mechanism for maintaining zero calibration while automatically releasing the rotatable element of the sensor for rotation with the rotatable body in response to installation of the sensor on the rotatable body.

According to further aspect of the invention methodology, the connector member comprises a ring member having an annular main body portion; the key structure comprises a key finger projecting from the main body portion and sized for coaction with a keyway on the rotatable body; and the anti-rotation structure comprises an anti-rotation finger projecting from the main body portion at a location spaced circumferentially from the key finger and sized for receipt in a notch in the sensor housing. This specific connector member construction provides a ready and effective means of carrying out the invention methodology.

According to a further feature of the invention methodology, the anti-rotation finger includes a locking portion for engagement with the notch in the sensor housing and a release portion; and the release portion is operative during mounting of the sensor assembly on the rotatable body to move the locking portion out of engagement with the sensor housing notch in response to engagement of the release portion by the rotatable body. This specific connector member construction facilitates the step of releasing the rotatable element from locking engagement with the sensor housing in response to mounting of the sensor assembly on the rotatable body.

According to a further feature of the invention methodology, the rotatable element of the sensor comprises a ring gear having circumferentially spaced teeth on its external periphery and circumferentially spaced notches on its internal periphery; and the connector member further includes a plurality of circumferentially spaced coupling fingers projecting from the main body portion for respective receipt in the notches in the internal periphery of the ring gear. This arrangement provides a ready and effective means of coupling the connector member to the ring member to facilitate carrying out the invention methodology.

In the preferred embodiment of the invention the rotatable body comprises the steering column of a motor vehicle and the sensor assembly is operative to sense the angular position of the steering column and generate a control signal representative of the angular position of the steering column.

With respect to the apparatus aspect of the invention, the sensor assembly is of a type including a sensor housing, a rotatable element mounted in the housing, and means operative to sense the angular position of the rotatable element and generate a control signal representative of the angular position of the rotatable element.

According to the invention, the sensor assembly further includes a connector member for selectively interconnecting the rotatable body, the sensor housing, and the rotatable element, and the connector member includes a coupling structure for coupling the connector member to the rotatable element, a key structure for keying the connector member to the rotatable body in response to mounting of the sensor assembly on the rotatable body, an anti-rotation structure for lockingly engaging the connector member to the sensor housing to preclude rotation of the connector member and rotatable element relative to the sensor housing, and a release structure operative in response to mounting of the sensor assembly on the rotatable body to release the anti-rotation structure from locking engagement with the sensor housing and allow rotation of the rotatable element with the rotatable body. The recited connector member will be seen to provide a convenient means of maintaining the initial zero calibration of the sensor prior to installation on the rotatable body and to further provide automatic means to release the anti-rotation structure from locking engagement with the sensor housing in response to mounting of the sensor on the rotatable body.

According to further apparatus feature of the invention, the connector member comprises a ring member adapted to be positioned in surrounding relation to the rotatable body; the ring member includes an annular main body portion; the key structure comprises a key finger projecting from the main body portion for coaction with a keyway on the rotatable body; the anti-rotation structure comprises an anti-rotation finger projecting from the main body portion at a location spaced circumferentially from the key finger and coacting with a notch in the sensor housing; and the release structure comprises a release portion of the anti-rotation finger positioned in the path of the rotatable body as the sensor assembly is mounted on the rotatable body and operative in response to engagement with the rotatable body to move the anti-rotation finger out of the notch of the sensor assembly. The specific connector member construction facilitates the selective coaction between the connector member, the sensor housing, the rotatable element, and the rotatable body.

According to a further apparatus aspect of the invention, a pivot point is defined at the juncture of the anti-rotation finger and the main body portion and the point of engagement between the release portion of the anti-rotation finger and the rotatable body is spaced inwardly from the pivot point so that the anti-rotation finger is pivoted about the pivot point in response to engagement by the rotatable body. This specific pivotal arrangement provides a ready and effective means of unlocking the rotatable element of the sensor from the sensor housing as the sensor is mounted on the rotatable body.

According to a further apparatus aspect of the invention, the finger comprises a compound finger including a first finger portion extending inwardly from the main body portion and a second finger portion doubled over with respect to the first finger portion so as to extend outwardly to define a free end adapted to coact with the notch in the sensor housing. This specific finger construction provides both a locking and a release function in a single finger configuration.

According to a further apparatus aspect of the invention, the first portion of the compound finger extends downwardly and inwardly and the second portion extends upwardly and outwardly and has the length extending a length of the first portion so as to position the free end thereof above the main body portion to facilitate engagement with the sensor housing notch.

According to a further apparatus aspect of the invention, the coupling structure comprises a plurality of circumferentially spaced coupling fingers projecting from the main body portion for engagement with the rotatable element and the coupling fingers are further operative to center the sensor assembly with respect to the rotatable body as the sensor assembly is mounted on the rotatable body. The coupling fingers will be seen to enable the connector member to perform the dual functions of coupling the connector member and the rotatable element and centering the sensor assembly on the rotatable body as the sensor assembly is mounted on the rotatable body.

BRIEF DESCRIPTION OF THE DRAWINGS

The description herein makes reference to the accompanying drawings wherein like reference numerals refer to like parts throughout the several views, and wherein:

FIG. 4 is a perspective view of a connector member employed in the sensor assembly; and FIGS. 5, 6, and 7 are progressive schematic views showing the installation of the sensor assembly on the steering column of the motor vehicle.

Other applications of the present invention will become apparent to those skilled in the art when the following description of the best mode contemplated for practicing the invention is read in conjunction with the accompanying drawings.

DETAILED DESCRIPTION OF THE PREFERRED EMBODIMENT

Figure 1:
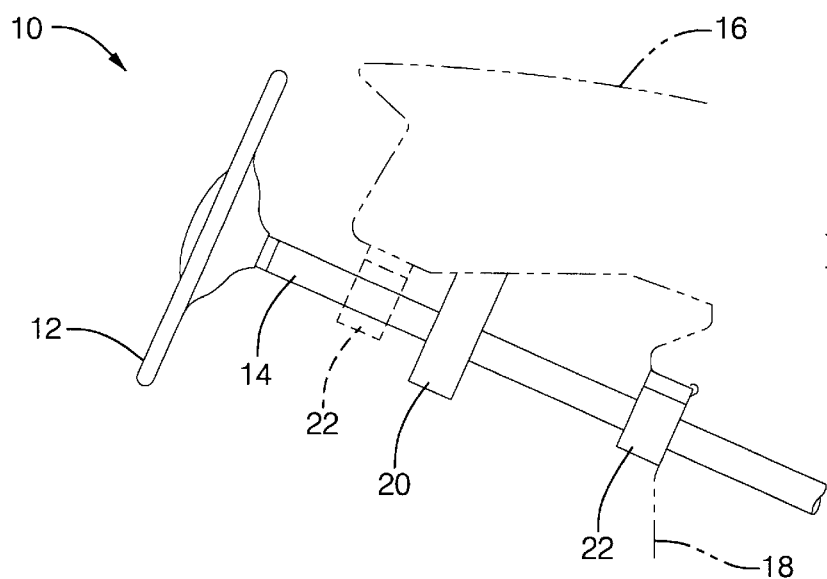
FIG. 1 is a fragmentary schematic view of a motor vehicle illustrating the steering column, instrument panel and fire wall of the vehicle.

The position sensor of the invention is seen in FIG. 1 in association with a motor vehicle 10 shown fragmentary. Motor vehicle 10 includes a steering wheel 12, a steering column 14, an instrument panel 16, and a firewall 18. Steering column 14 is supported in known manner from the instrument panel 16 by a bracket structure 20 and extends through the firewall 18 for coaction in known manner with a steering mechanism.

A sensor assembly 22 according to the invention is provided in surrounding relation to steering column 14 to sense the angular position of the steering column and to generate a control signal representative of the angular position of the steering column. Sensor assembly 22 may be mounted as shown proximate the firewall 18 of the vehicle or, alternatively, as shown in dash lines, may be mounted proximate the steering wheel 12.

Figure 3:
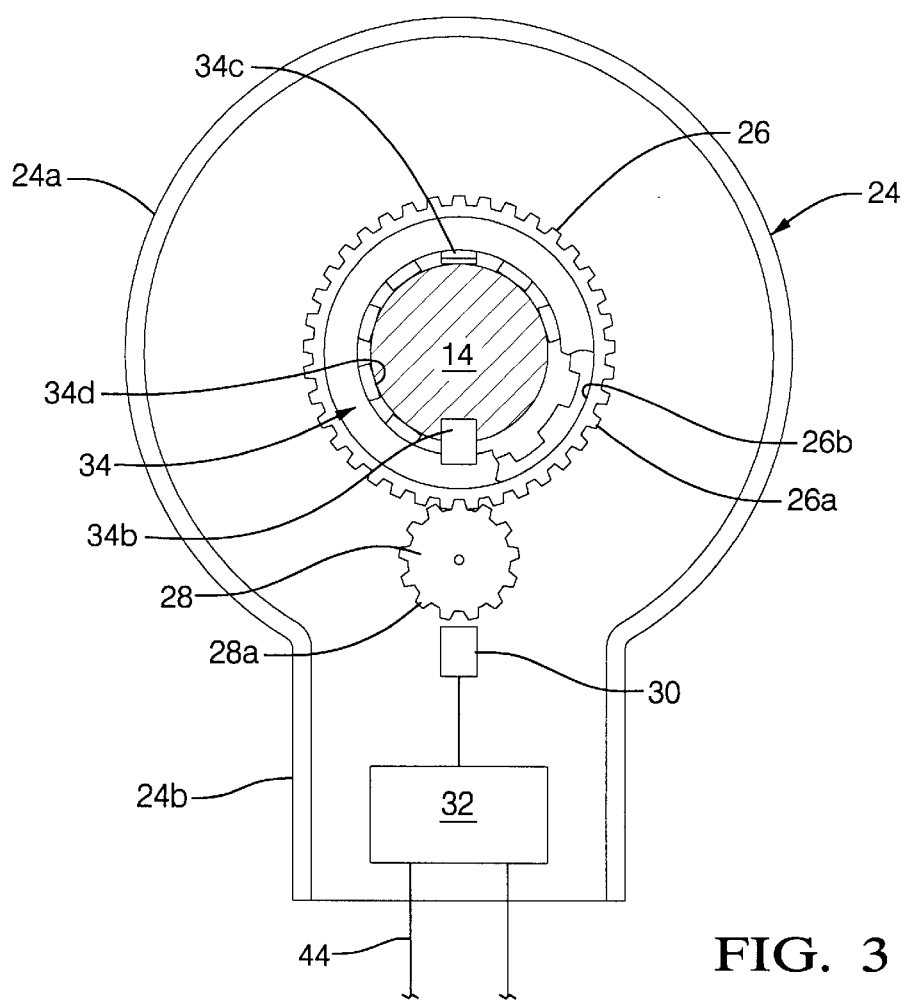
FIG. 3 is a schematic cross sectional view taken on line 3—3 of FIG. 2.
Figure 2:
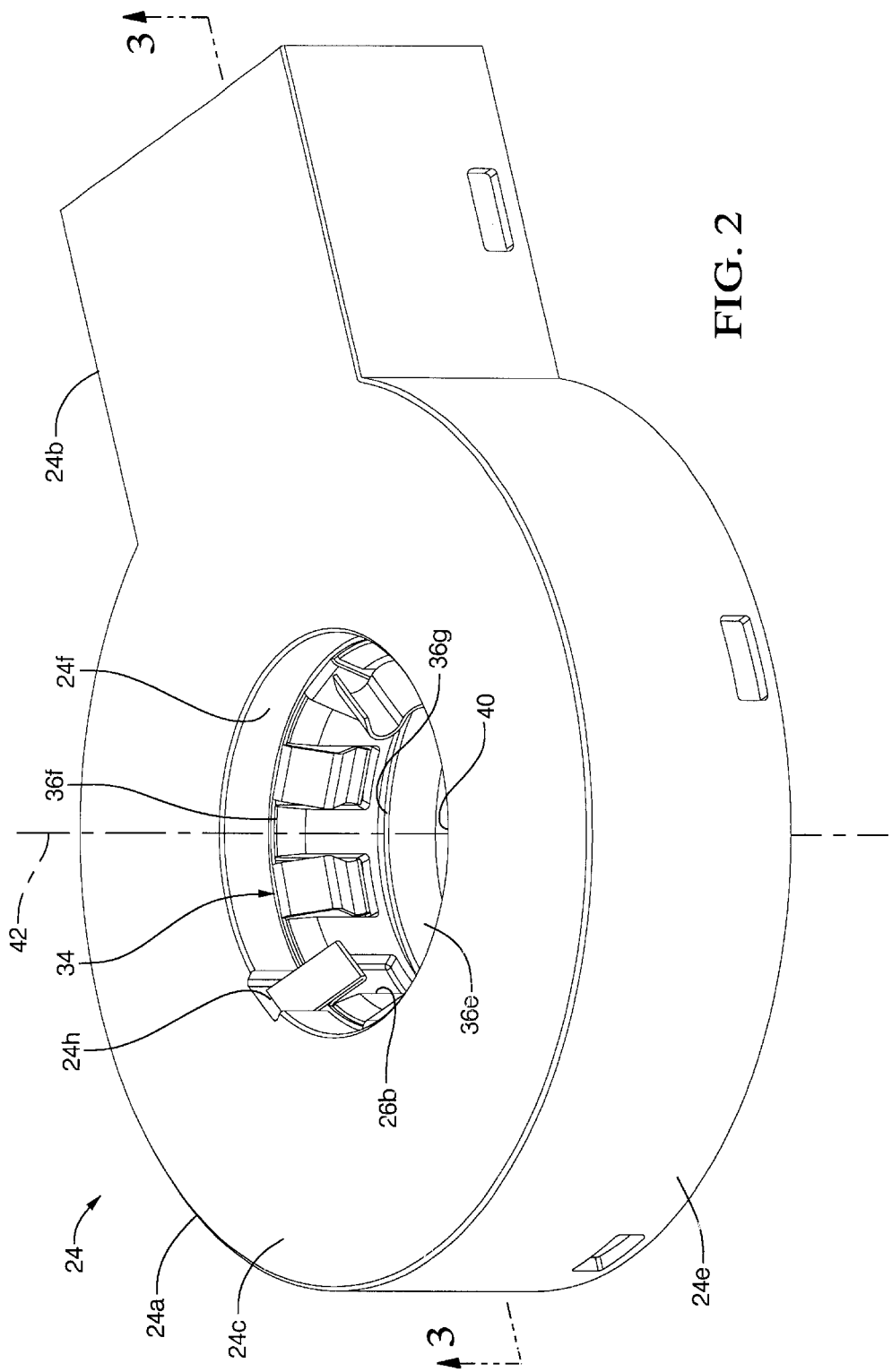
FIG. 2 is a perspective view of a sensor assembly according to the invention.

Sensor assembly 22 (FIGS. 2 and 3) comprises a sensor housing 24, an operative rotatable element in the form of a ring gear 26, a secondary gear 28 meshingly engaging with ring gear 26, an angle sensor 30 tracking the angular position of secondary gear 28, an electronic evaluation circuit 32 receiving input from the angle sensor 30, and a connector member 34.

In overview, it will be understood that the sensor assembly 22 functions to track the angular position of the steering column 14 and generate a control signal representative of this angular position for transmittal to further vehicle control apparatus such as, for example, control apparatus constituting a steer-by-wire system for the vehicle.

Housing 24 (FIG. 2) has a key hole shaped configuration and includes an annular generally cylindrical main body portion 24a and a stem portion 24b extending radially from the cylindrical main body portion 24a.

Main body portion 24a defines a generally circular central opening 40 sized to pass steering column 14, and includes an upper annular wall portion 24c, a lower annular wall portion 24d, an outer peripheral annular wall 24e, an upper annular lip 24f defining opening 40, and a lower annular lip 24g further defining opening 40. An anti-rotation detent or notch 24h is provided in upper lip 24f.

Ring gear 26 is mounted within housing 24 and specifically is mounted in the space between the lower edge 24i of lip 24f and the upper edge 24j of lip 24g in concentrical relation to the central axis 42 of the main body portion of the housing. Ring gear 26 includes a plurality of circumferentially spaced teeth 26a on its external periphery and a plurality of circumferentially spaced notches 26b on its internal periphery.

Secondary gear 28 is positioned within the housing 24 in meshing engagement with ring gear 26 and includes a plurality of circumferentially spaced teeth 28a. There may be, for example, a gear ratio of approximately 5.2:1.0 between ring gear 26 and secondary gear 28.

Angle sensor 30 comprises a periodic angle sensor and may, for example, comprise a Hall Effect sensor.

Electronic evaluation circuit 32 is of known form and is operative to receive input from angle sensor 30 and perform calculations required for determining the angular position of the steering column 14.

This invention concerns primarily connector member 34 (FIGS. 4–7) and the manner in which the connector member interconnects the various elements of the sensor assembly and facilitates the installation of the sensor assembly on the steering column while preserving the previously determined zero position calibration of the sensor.

Connector member 34 comprises a ring member including an annular main body portion 34a, a key structure constituted by a key finger 34b projecting generally upwardly from main body portion 34a for coaction with an axial keyway 14a on the steering column, an anti-rotation structure in the form of an anti-rotation finger 34c projecting from the main body portion 34a at a location spaced circumferentially from key finger 34b for coaction with notch 24h in the sensor housing, a plurality of circumferentially spaced anti-withdrawal fingers 34d projecting generally outwardly from the main body portion for engagement with the sensor housing to preclude inadvertent separation of the ring member from the sensor housing, and a plurality of circumferentially spaced coupling fingers 34x extending generally downwardly from the main body portion for respective receipt in ring gear notches 26b whereby to couple the ring member to the ring gear.

Anti-rotation finger 34c comprises a compound finger including a first finger portion 34e extending inwardly from the main body portion and a second finger portion 34f doubled over with respect to the first finger portion so as to extend outwardly and defining a free end 34g for coaction with notch 24h in the sensor housing. In relaxed configuration, the first finger portion 34e extends downwardly and radially inwardly from the main body portion and the second finger portion 34f extends upwardly and outwardly and has a length exceeding the length of the first finger portion so as to position the free end 34g above the main body portion to facilitate engagement with the sensor housing notch 24h. A pivot point 34h will be seen to be defined at the juncture of the finger portion 34e and the main body portion 34a and the point of engagement 42 between the free end 14b of the steering column 14 and the anti-rotation finger 34c as the sensor assembly is installed on the steering column 14 is spaced radially inwardly from the pivot point so that the anti-rotation finger is pivoted about the pivot point 34h in response to engagement by the steering column 14 from the relaxed, pre-installation seen in FIG. 5 to the displaced installation position seen FIGS. 4 and 7. The anti-withdrawal fingers 34d are positioned beneath the lip 24i of the main body housing portion to preclude withdrawal of the ring member from the housing and the coupling fingers 34x are respectively received in the notches 26b of the ring member whereby to couple the ring member 34 to the ring gear 26.

CALIBRATION AND INSTALLATION

At the site of manufacture of the sensor assembly the sensor assembly is calibrated to a zero position and this zero position is defined and maintained by engagement of the free end 34g of the anti-rotation finger 34c in the anti-rotation notch 24h of the sensor housing. This positive engagement of the anti-rotation finger in the anti-rotation notch eliminates the possibility that the zero position calibration of the sensor assembly will be disturbed during subsequent handling of the sensor assembly and, specifically, ensures that the zero calibration position will not be disturbed during shipment of the sensor assembly from the point of manufacture of the sensor assembly to a subsequent assembly point which may comprise, for example, an assembly point for the steering column assembly or, alternatively, may comprise a final assembly location. Upon arrival at the sensor assembly at the steering column or the final assembly location, the sensor assembly is mounted on the steering column 14. The mounting sequence is illustrated in successive FIGS. 5, 6 and 7, with FIG. 5 showing the disposition of ring member 34 immediately prior to the installation of the sensor assembly on the steering column, FIG. 6 showing the disposition of the ring member relative to the steering column upon initial contact between the free end 14b of the steering column and the anti-rotation finger 34c, and FIG. 7 illustrating the installed disposition of the ring member on the steering column.

As seen in FIG. 5, the initial contact between the ring member and the steering column comprises sliding entry of the key finger 34b of the ring member into steering column keyway 14a whereby to locate the ring member circumferentially relative to the steering column and key the ring member to the steering column.

Figure 6:
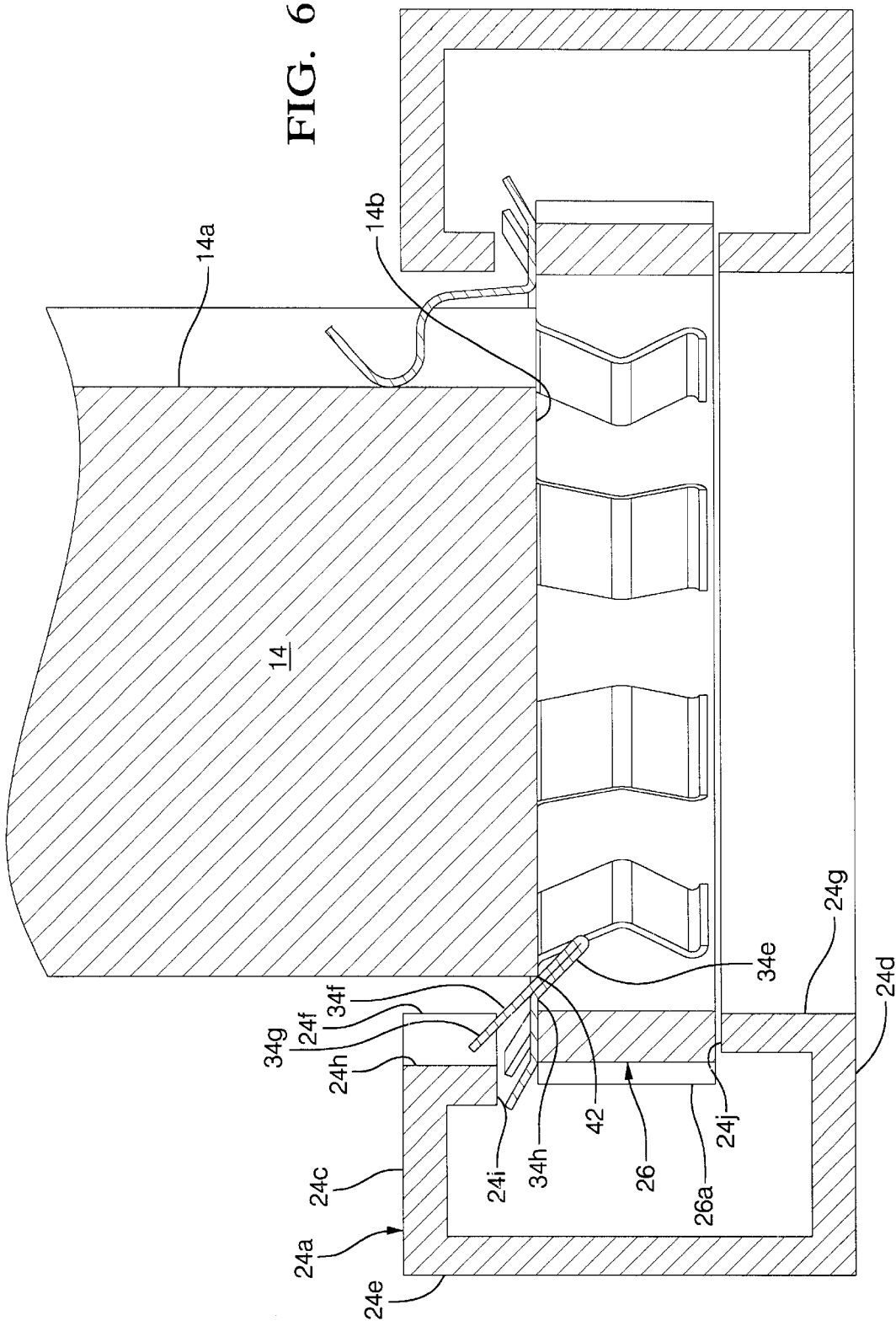

As seen in FIG. 6, further movement of the sensor assembly onto the free end of the steering column results in the engagement free end 14b of the steering column with anti-rotation finger 34c at the point 42 spaced radially inwardly from the pivot point 34h.

Figure 7:
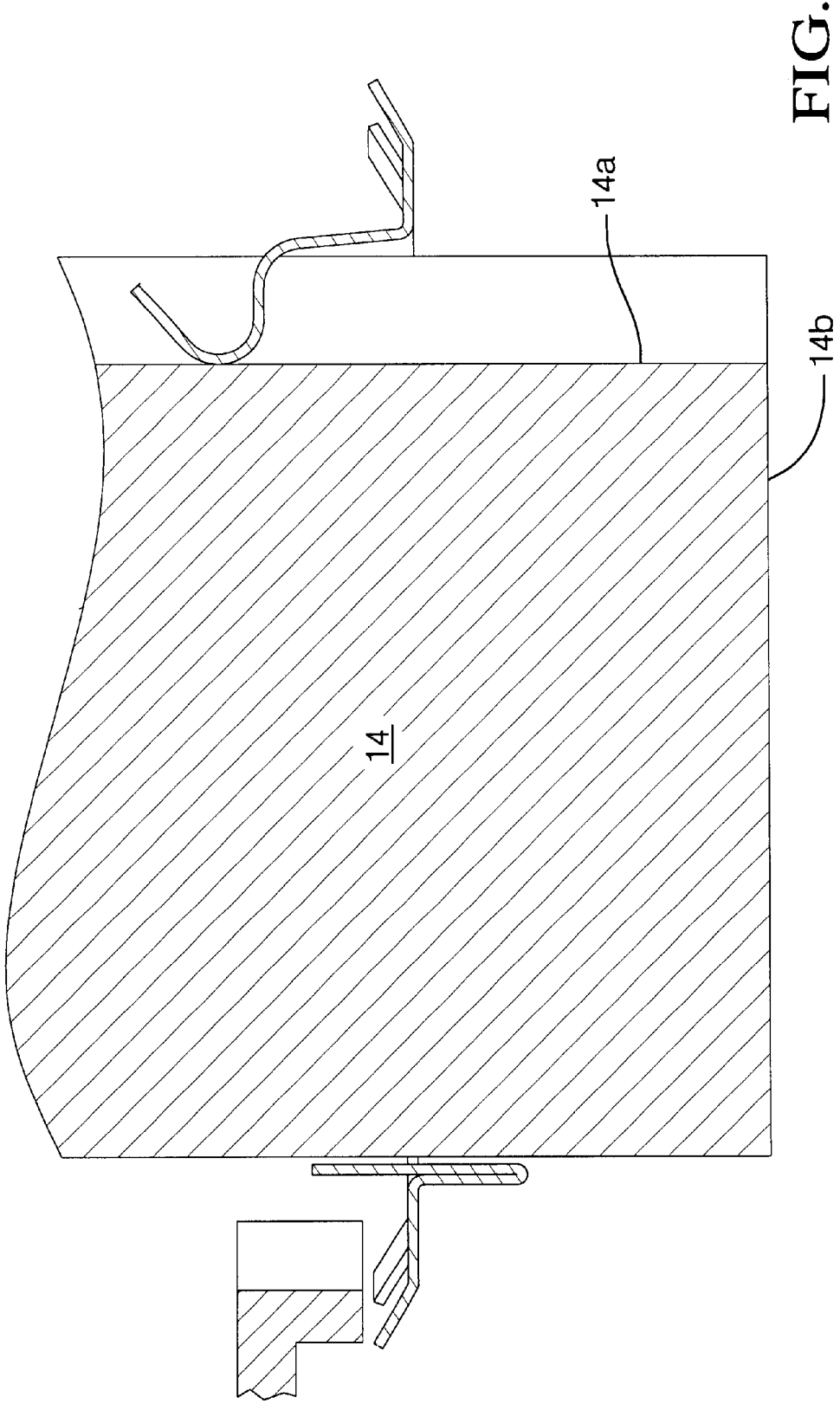

As seen in FIG. 7, with continued movement of the sensor assembly onto the steering column, the anti-rotation finger is pivoted downwardly to the position seen in FIG. 7 wherein the free end 34g has been rotated out of engagement with housing notch 24f whereby to allow the ring member and ring gear to freely rotate with the steering column relative to the sensor housing. Note that during the mounting of the sensor assembly onto the steering column the coupling fingers 34d further serve to center the sensor assembly on the steering column. It will be seen that anti-rotation finger 34c defines both a locking portion or structure for locking engagement with the sensor housing and a release portion or structure for coaction with the steering column to release the locking structure.

In operation, the ring member turns with the steering column by virtue of the interaction of the key finger 34*b* and the keyway 14*b*; the ring gear 26 turns with the ring member by virtue of the coupling action of the coupling fingers 34*d*; the secondary gear 28 is driven by the ring member; the extent of rotation of the secondary gear is tracked by the angle sensor 30; the angle sensor 30 generates a signal for transmission to the electronic evaluation circuit 32; and the electronic evaluation circuit 32 evaluates the information received from angle sensor 30 and transmits the evaluated information, for example by way of leads 42, to an appropriate on-board vehicle mechanism such for example as a steer-by-wire system, a four wheel steering system, or active suspension system.

The invention will seen to provide a method and apparatus whereby a sensor assembly may be calibrated and thereafter installed on a steering column or other rotatable body in a manner to ensure that the calibration is maintained between calibration and installation and in a manner to automatically release the operative sensor mechanism for free rotation with the rotatable body in response to installation on the rotatable body.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A sensor assembly for sensing the angular position of a rotatable body and including a sensor housing, a rotatable element mounted in the housing, and sensor means operative to sense the angular position of the rotatable element and generate a control signal representative of the angular position of the rotatable element, characterized in that:

the sensor assembly includes a connector member for selectively interconnecting the rotatable body, the sensor housing, and the rotatable element;

the connector member includes a coupling structure for coupling the connector member to the rotatable element, a key structure for keying the connector member to the rotatable body in response to mounting of the sensor assembly on the rotatable body, an anti-rotation structure for lockingly engaging the connector member to the sensor housing to preclude rotation of the connector member and rotatable element relative to the sensor housing, and a release structure operative in response to mounting of the sensor assembly on the rotatable body to release the anti-rotation structure from locking engagement with the sensor housing and allow rotation of the rotatable element with the rotatable body.

2. A sensor assembly according to claim 1 wherein the connector member comprises a ring member adapted to be positioned in surrounding relation to the rotatable body.

3. A sensor assembly according to claim 2 wherein:

the ring member includes an annular main body portion;

the key structure comprises a key finger projecting from the main body portion for coaction with a keyway on the rotatable body;

the anti-rotation structure comprises an anti-rotation finger projecting from the main body portion at a location spaced circumferentially from the key finger and coacting with a notch in the sensor housing; and the release structure comprises a release portion of the anti-rotation finger positioned in the path of the rotatable body as the sensor assembly is mounted on the rotatable body and operative in response to engagement with the rotatable body to move the anti-rotation finger out of the notch of the sensor assembly.

4. A sensor assembly according to claim 3 wherein:

a pivot point is defined at the juncture of the anti-rotation finger and the main body portion; and the point of engagement between the release portion of the anti-rotation finger and the rotatable body is spaced from the pivot point so that the anti-rotation finger is pivoted about the pivot point in response to engagement by the rotatable body.

5. A sensor assembly according to claim 4 wherein the anti-rotation finger comprises a compound finger including a first finger portion extending inwardly from the main body portion and a second finger portion doubled over with respect to the first finger portion so at to extend outwardly and defining a free end adapted to coact with the notch in the sensor housing.

6. A sensor assembly according to claim 5 wherein:

the first portion extends downwardly and inwardly; and the second portion extends upwardly and outwardly and has a length exceeding the length of the first portion so as to position the free end thereof above the main body portion to facilitate engagement with the sensor housing notch.

7. A sensor assembly according to claim 3 wherein:

the coupling structure comprises a plurality of circumferentially spaced coupling fingers projecting from the main body portion for engagement with the rotatable element; and the coupling fingers are further operative to center the sensor assembly with respect to the rotatable body as the sensor assembly is mounted on the rotatable body.

8. A sensor assembly according to claim 7 wherein the connector member further includes a plurality of circumferentially spaced anti-withdrawal fingers projecting from the main body portion for engagement with the sensor housing and operative to preclude inadvertent separation of the connector member and rotatable element from the sensor housing.

9. A sensor assembly according to claim 6 wherein the rotatable body comprises the steering column of a motor vehicle.

10. A sensor assembly for sensing the angular position of a rotatable body and including an annular sensor housing adapted to be positioned in surrounding relation to the rotatable body and an annular rotatable sensor element mounted for rotation within the sensor housing in surrounding relation to the rotatable body, characterized in that the sensor assembly further includes a connector ring including a coupling structure for connecting the ring to the rotatable element, a key structure for keying the connector ring to the rotatable body in response to mounting of the sensor assembly on the rotatable body, an anti-rotation structure for lockingly engaging the connector ring to the sensor housing, and a release structure operative in response to mounting of the sensor assembly on the rotatable body to release the anti-rotation structure from locking engagement with the sensor housing and allow the rotatable element to rotate with the rotatable body.

11. A sensor assembly according to claim 10 wherein:

the rotatable body comprises the steering column of a motor vehicle; and the sensor assembly further includes means operative to sense the angular position of the annular sensor element and generate a control signal representative of the angular position of the annular sensor element and thereby of the steering column.

12. A sensor assembly according to claim 10 wherein:

the connector ring includes an annular main body portion;

the key structure is constituted by a key finger projecting from the main body portion; and the anti-rotation structure and the release structure are constituted by a finger structure projecting from the main body portion and including an anti-rotation portion for locking engagement with the sensor housing and a release portion operative in response to engagement of the residual body as the sensor assembly is mounted on the rotatable body to move the anti-rotation portion out of engagement with the sensor housing.

13. A sensor assembly according to claim 12 wherein the finger structure includes a first finger portion extending inwardly from the main body portion and a second finger portion doubled over with respect to the first finger portion so as to extend outwardly and defining a free end adapted to coact with a notch in the sensor housing.

\* \* \* \* \*